US010386740B2

(12) United States Patent
Kubo

(10) Patent No.: US 10,386,740 B2
(45) Date of Patent: Aug. 20, 2019

(54) BINDER RESIN COMPOSITION FOR TONERS

(71) Applicant: Kao Corporation, Tokyo (JP)

(72) Inventor: Takashi Kubo, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 15/768,955

(22) PCT Filed: Aug. 2, 2016

(86) PCT No.: PCT/JP2016/072643
§ 371 (c)(1),
(2) Date: Apr. 17, 2018

(87) PCT Pub. No.: WO2017/077748
PCT Pub. Date: May 11, 2017

(65) Prior Publication Data

US 2018/0299799 A1 Oct. 18, 2018

(30) Foreign Application Priority Data

Nov. 4, 2015 (JP) ................................ 2015-216852

(51) Int. Cl.

| | |
|---|---|
| ***G03G 9/08*** | (2006.01) |
| ***G03G 9/087*** | (2006.01) |
| ***C08G 63/91*** | (2006.01) |
| ***C08G 63/12*** | (2006.01) |
| ***C08G 63/46*** | (2006.01) |
| ***C08L 67/02*** | (2006.01) |

(52) U.S. Cl.
CPC ......... *G03G 9/08755* (2013.01); *C08G 63/12* (2013.01); *C08G 63/46* (2013.01); *C08G 63/916* (2013.01); *C08L 67/02* (2013.01); *G03G 9/087* (2013.01); *C08L 2205/025* (2013.01)

(58) Field of Classification Search
CPC .......................... G03G 9/08755; C08G 63/916
USPC ....................................................... 430/109.4
See application file for complete search history.

(56) References Cited

U.S. PATENT DOCUMENTS

| | | | | |
|---|---|---|---|---|
| 2003/0083191 A1* | 5/2003 | Nakajima | C08G 63/82 | 502/100 |
| 2004/0086734 A1* | 5/2004 | Janssens | B32B 27/20 | 428/482 |
| 2008/0261131 A1 | 10/2008 | Nakayama et al. | | |
| 2014/0363765 A1* | 12/2014 | Fukuri | G03G 9/081 | 430/137.15 |

FOREIGN PATENT DOCUMENTS

| | | |
|---|---|---|
| JP | 8-253596 A | 10/1996 |
| JP | 2001-46474 A | 2/2001 |
| JP | 2001-80014 A | 3/2001 |
| JP | 2004-10679 A | 1/2004 |
| JP | 2004-163808 A | 6/2004 |
| JP | 2004-280084 A | 10/2004 |
| JP | 2005-343953 A | 12/2005 |
| JP | 2008-129411 A | 6/2008 |
| JP | 2009-276791 A | 11/2009 |
| JP | 2010-107678 A | 5/2010 |
| JP | 2015-63604 A | 4/2015 |
| JP | 2015-66234 A | 4/2015 |

OTHER PUBLICATIONS

International Search Report dated Oct. 18, 2016 in PCT/JP2016/072643, citing documents AA and AR-AW therein, 2 pages.
Supplementary European Search Report dated May 17, 2019 issued in corresponding European patent application No. 16861817.1.

* cited by examiner

*Primary Examiner* — Mark A Chapman
(74) *Attorney, Agent, or Firm* — Oblon, McClelland, Maier & Neustadt, L.L.P.

(57) ABSTRACT

A resin binder composition for a toner, containing a polyester resin, which is a polycondensate of a polyethylene terephthalate, a carboxylic acid component, and an alcohol component, wherein the polyethylene terephthalate contains a polyethylene terephthalate having a IV value of 0.40 or more and 0.75 or less, and wherein the alcohol component contains an aliphatic diol having a hydroxyl group bonded to a secondary carbon atom having 2 or more carbon atoms and 4 or less carbon atoms in an amount of 40% by mol or more and 100% by mol or less, a method for producing a polyester resin contained in the resin binder composition, and a toner for electrophotography containing the resin binder composition. The resin binder composition for a toner of the present invention is suitably used in the toner for electrophotography usable in development or the like of latent images formed in, for example, method for electrostatic image development, electrostatic recording method, electrostatic printing method or the like.

13 Claims, No Drawings

BINDER RESIN COMPOSITION FOR TONERS

FIELD OF THE INVENTION

The present invention relates to a resin binder composition for a toner usable in development of latent images formed in electrophotography, electrostatic recording method, electrostatic printing method or the like, a method for producing a polyester resin contained in the resin binder composition, and a toner for electrophotography containing the resin binder composition.

BACKGROUND OF THE INVENTION

In the recent years, with the speeding up and conservation of energy of printers and copy machines, toners having excellent low-temperature fusing ability are even more in demand. In addition, during the high-speed printing, toners are needed to have speediness in initial rise in charging.

In view of the above, a short-chained aliphatic diol has been used, from the viewpoint of improving low-temperature fusing ability.

On the other hand, as a means for improving durability, it has been known that a polyethylene terephthalate (PET) is used as a raw material, and allowed to react by transesterification (see, Patent Publication 1).

Patent Publication 1: Japanese Patent Laid-Open No. 2009-276791

SUMMARY OF THE INVENTION

The present invention relates to:

[1] a resin binder composition for a toner, containing a polyester resin, which is a polycondensate of a polyethylene terephthalate, a carboxylic acid component, and an alcohol component, wherein the polyethylene terephthalate contains a polyethylene terephthalate having a IV value of 0.40 or more and 0.75 or less, and wherein the alcohol component contains an aliphatic diol having a hydroxyl group bonded to a secondary carbon atom having 2 or more carbon atoms and 4 or less carbon atoms in an amount of 40% by mol or more and 100% by mol or less;

[2] a method for producing a polyester resin including the step of carrying out a polycondensation reaction of a polyethylene terephthalate, a carboxylic acid component, and an alcohol component in the presence of an esterification catalyst, wherein the polyethylene terephthalate contains a polyethylene terephthalate having a IV value of 0.40 or more and 0.75 or less, and wherein the alcohol component contains an aliphatic diol having a hydroxyl group bonded to a secondary carbon atom having 2 or more carbon atoms and 4 or less carbon atoms in an amount of 40% by mol or more and 100% by mol or less; and

[3] a toner for electrophotography containing a resin binder composition for a toner as defined in the above [1].

DETAILED DESCRIPTION OF THE INVENTION

However, the conventional resin binder compositions for toners using PET, are not necessarily sufficiently satisfactory in the aspect of initial rise in charging even though they have excellent durability.

This is assumed to be due to the matter that the molecular weight of the PET is markedly high as compared to the polyester resin usable in the resin binder for a toner, so that a large PET unit with insufficient depolymerization remains in the polymer, thereby making the polymer structure uneven.

On the other hand, a polyester resin in which a short-chained aliphatic diol is introduced has low mechanical strength, thereby having a problem of generating filming of a toner on a photoconductor. In view of the above, it has been expected to improve mechanical strength by introducing PET, but improved effects are not obtained because of the presence of uneven sites owing to depolymerization as mentioned above.

The present invention relates to a resin binder composition for a toner having excellent low-temperature fusing ability and initial rise in charging, and excellent filming resistance on the photoconductor, a method for producing a polyester resin contained in the resin binder composition, and a toner for electrophotography containing the resin binder composition.

The toner for electrophotography containing the resin binder composition of the present invention exhibits some excellent effects in low-temperature fusing ability, initial rise in charging, and filming resistance on the photoconductor.

The resin binder composition for a toner of the present invention contains a polyester resin which is a polycondensate of a polyethylene terephthalate (PET), a carboxylic acid component, and an alcohol component, which has a great feature in the aspect that the above polyethylene terephthalate contains a polyethylene terephthalate having a IV value of 0.40 or more and 0.75 or less. The content of the polyethylene terephthalate having a IV value of 0.40 or more and 0.75 or less is preferably 90% by mass or more, more preferably 95% by mass or more, even more preferably 98% by mass or more, and even more preferably 100% by mass, of a total amount of the polyethylene terephthalate used in the polycondensation with the alcohol component and the carboxylic acid component. Here, the resin binder composition for a toner of the present invention may contain a polyethylene terephthalate having a IV value of less than 0.40 or a polyethylene terephthalate having a IV value of exceeding 0.75, within a range that would not impair the effects of the present invention.

Usually, the PET to be introduced into a polyester resin which is usable as a resin binder for a toner has a IV value of from 0.80 to 1.10 or so, so that a PET having a IV value of 0.40 or more and 0.75 or less has a lower IV value than the conventionally used PET, in other words, a PET having a lower molecular weight. In the present invention, by introducing a PET having a low IV value (low molecular weight) to a polyester resin, the depolymerization of the PET is more evenly progressed. As a result, the PET can be evenly dispersed in the polymer while keeping a PET backbone having high polarity, so that it is assumed that an initial rise in charging is more remarkably improved than the conventional PET-introduced resin. Further, since the PET is evenly dispersed, it is assumed that the lowering of the mechanical strength due to the introduction of a short-chained aliphatic diol is improved, and filming resistance on the photoconductor is improved.

As the PET, those produced by polycondensing ethylene glycol and terephthalic acid or dimethyl terephthalate, or the like in accordance with a conventional method can be used.

The IV value of the PET is 0.40 or more, preferably 0.50 or more, and more preferably 0.55 or more, from the viewpoint of dispersibility of colorant, and the IV value is 0.75 or less, preferably 0.72 or less, more preferably 0.68 or less, even more preferably 0.65 or less, and even more preferably 0.62 or less, from the viewpoint of low-temperature fusing ability and evenness of the depolymerization, resulting in initial rise in charging and filming resistance on the photoconductor. The IV value is an intrinsic viscosity, which serves as an index for a molecular weight. The IV value of the PET can be adjusted by polycondensation time or the like.

Commercially available products for PETs having a IV value of 0.40 or more and 0.75 or less include RAMAPET L1, manufactured by Indorama Ventures, IV value: 0.60; RAMAPET N2G, manufactured by Indorama Ventures, IV value: 0.75; TRN-NTJ, manufactured by TEIJIN LIMITED, IV value: 0.53; TRN-RTJC, manufactured by TEIJIN LIMITED, IV value: 0.64), and the like.

It is preferable that the PET is polycondensed with the carboxylic acid component and the alcohol component in an amount that the unit of terephthalic acid-ethylene glycol (Mw: 192), based on 100 mol of a total of the carboxylic acid component and the alcohol component, is preferably 5 mol or more, more preferably 10 mol or more, and even more preferably 20 mol or more, from the viewpoint of initial rise in charging and filming resistance on the photoconductor, and the PET is in an amount of preferably 90 mol or less, more preferably 80 mol or less, even more preferably 70 mol or less, and even more preferably 60 mol or less, from the viewpoint of low-temperature fusing ability and filming resistance on the photoconductor.

The alcohol component contains an aliphatic diol having a hydroxyl group bonded to a secondary carbon atom having 2 or more carbon atoms and 4 or less carbon atoms, from the viewpoint of initial rise of charging.

The aliphatic diol having a hydroxyl group bonded to a secondary carbon atom having 2 or more carbon atoms and 4 or less carbon atoms is at least one member selected from the group consisting of 1,2-propanediol, 1,2-butanediol, 1,3-butanediol, and 2,3-butanediol, among which 1,2-propanediol is preferred, from the viewpoint of satisfying both low-temperature fusing ability and storage property.

The content of the aliphatic diol having a hydroxyl group bonded to a secondary carbon atom having 2 or more carbon atoms and 4 or less carbon atoms, preferably 1,2-propanediol, is 40% by mol or more, preferably 50% by mol or more, more preferably 55% by mol or more, and even more preferably 60% by mol or more, and 100% by mol or less, preferably 95% by mol or less, more preferably 90% by mol or less, and even more preferably 85% by mol or less, of the alcohol component.

It is preferable that the alcohol component further contains an α,ω-linear alkanediol having 2 or more carbon atoms and 4 or less carbon atoms as a short-chained aliphatic diol, from the viewpoint of filming resistance.

The α,ω-linear alkanediol having 2 or more carbon atoms and 4 or less carbon atoms is at least one member selected from the group consisting of ethylene glycol, 1,3-propanediol, and 1,4-butanediol, among which 1,4-butanediol is preferred, from the viewpoint of low-temperature fusing ability and filming resistance on the photoconductor.

The content of the α,ω-linear alkanediol having 2 or more carbon atoms and 4 or less carbon atoms, preferably 1,4-butanediol, in the alcohol component is preferably 5% by mol or more, more preferably 10% by mol or more, and even more preferably 15% by mol or more, and, from the viewpoint of storage property, the content is preferably 50% by mol or less, more preferably 45% by mol or less, and even more preferably 40% by mol or less.

In addition, the molar ratio of the aliphatic diol having a hydroxyl group bonded to a secondary carbon atom having 2 or more carbon atoms and 4 or less carbon atoms to the α,ω-linear alkanediol having 2 or more carbon atoms and 4 or less carbon atoms, i.e. the aliphatic diol having a hydroxyl group bonded to a secondary carbon atom/the α,ω-linear alkanediol, is preferably 50/50 or more, more preferably 55/45 or more, and even more preferably 60/40 or more, from the viewpoint of filming resistance and storage property, and the molar ratio is preferably 95/5 or less, more preferably 90/10 or less, and even more preferably 85/15 or less, from the viewpoint of low-temperature fusing ability and filming resistance on the photoconductor.

The content of the aliphatic diol is preferably 80% by mol or more, more preferably 90% by mol or more, even more preferably 95% by mol or more, and even more preferably 100% by mol, of the alcohol component, from the viewpoint of initial rise of charging.

Other alcohol components include aromatic diols such as alkylene oxide adducts of bisphenol A, aliphatic diols having 5 or more carbon atoms, trihydric or higher polyhydric alcohols such as glycerol, and the like.

The carboxylic acid component is preferably at least one member selected from the group consisting of aromatic dicarboxylic acid compounds, aliphatic dicarboxylic acid compounds, and tricarboxylic or higher polycarboxylic acid compounds, and, from the viewpoint of initial rise in charging, the carboxylic acid component more preferably contains an aromatic dicarboxylic acid compound.

The aromatic dicarboxylic acid compound includes phthalic acid, isophthalic acid, terephthalic acid, anhydrides of those acids, alkyl (1 to 3 carbon atoms) esters of those acids, and the like. Among them, terephthalic acid or isophthalic acid is preferred, and terephthalic acid is more preferred, from the viewpoint of low-temperature fusing ability.

The content of the aromatic dicarboxylic acid compound is preferably 20% by mol or more, and more preferably 40% by mol or more, and preferably 95% by mol or less, more preferably 90% by mol or less, even more preferably 85% by mol or less, and even more preferably 70% by mol or less, of the carboxylic acid component, from the viewpoint of low-temperature fusing ability.

The aliphatic dicarboxylic acid compound includes aliphatic dicarboxylic acids such as oxalic acid, malonic acid, maleic acid, fumaric acid, citraconic acid, itaconic acid, glutaconic acid, a succinic acid which may be substituted with an alkyl group having from 1 to 20 carbon atoms or an alkenyl group having from 2 to 20 carbon atoms, and an adipic acid; anhydrides of those acids, alkyl (1 to 3 carbon atoms) esters of those acids, and the like, and it is preferable that the aliphatic dicarboxylic acid compound contains a succinic acid substituted with an alkyl group having from 1 to 20 carbon atoms or an alkenyl group having from 2 to 20 carbon atoms, from the viewpoint of low-temperature fusing ability. The succinic acid is preferably a succinic acid substituted with an alkyl group or alkenyl group having from 6 to 14 carbon atoms, and more preferably a succinic acid substituted with an alkyl group or alkenyl group having from 8 to 12 carbon atoms. Specific examples include octylsuccinic acid, dodecenylsuccinic acid (tetrapropenylsuccinic acid), and the like.

The tricarboxylic or higher polycarboxylic acid compound includes 1,2,4-benzenetricarboxylic acid (trimellitic acid), 2,5,7-naphthalenetricarboxylic acid, pyromellitic acid, or acid anhydrides thereof, lower alkyl (1 to 3 carbon atoms) esters thereof, and the like, among which trimellitic acid compounds are preferred.

The alcohol component may contain a monohydric alcohol, and the carboxylic acid component may contain a monocarboxylic acid compound in proper amounts.

The polycondensation of the PET, the alcohol component, and the carboxylic acid component can be carried out, for example, in an inert gas atmosphere at a temperature of 180° C. or higher and 250° C. or lower or so, preferably in the presence of an esterification catalyst, further optionally in the presence of an esterification promoter, a polymerization inhibitor or the like. The esterification catalyst includes tin compounds such as dibutyltin oxide and tin(II) 2-ethylhexanoate; titanium compounds such as titanium diisopropylate bistriethanolaminate; and the like. The esterification promoter which can be used together with the esterification catalyst includes gallic acid, and the like. The amount of the esterification catalyst used, based on 100 parts by mass of a total amount of the PET, the alcohol component, and the carboxylic acid component, is preferably 0.01 parts by mass or more, and more preferably 0.1 parts by mass or more, and preferably 1 part by mass or less, and more preferably 0.6 parts by mass or less. The amount of the esterification promoter used, based on 100 parts by mass of a total amount of the PET, the alcohol component, and carboxylic acid component, is preferably 0.001 parts by mass or more, and more preferably 0.01 parts by mass or more, and preferably 0.5 parts by mass or less, and more preferably 0.1 parts by mass or less.

Here, the polyester resin in the present invention may be, for example, a urethane-modified polyester resin in which the above polyester resin is urethane-extended with a polyisocyanate compound, but it is preferable that the polyester resin is an unmodified polyester resin, from the viewpoint of improving low-temperature fusing ability, improving initial rise in charging, and/or improving colorant dispersibility.

The urethane modification of the polyester resin can be carried out by a conventional method. The polyisocyanate compound usable in the urethane-modified polyester resin includes, for example, diisocyanate compounds such as aliphatic diisocyanates and aromatic diisocyanates, and prepolymer-modified, isocyanurate-modified, urea-modified, and carbodiimide-modified forms of these diisocyanate compounds.

The aliphatic diisocyanate compound includes, for example, isophorone diisocyanate, 4,4'-dicyclohexylmethane diisocyanate, 4-methyl-1,3-cyclohexylene diisocyanate, 1,2-bis(isocyanatomethyl)cyclohexanehexamethylene diisocyanate, and the like.

The aromatic diisocyanate compound includes, for example, 4,4'-diphenylmethane diisocyanate, 2,4-tolylene diisocyanate, 2,6-tolylene diisocyanate, m-phenylene diisocyanate, p-phenylene diisocyanate, 1,3-xylylene diisocyanate, 1,4-xylylene diisocyanate, 1,5-naphthalene diisocyanate, 3,3 '-dimethyl-4,4'-biphenylene diisocyanate, and the like.

In addition, the resin binder composition for a toner of the present invention may be a composite resin containing a polyester resin using the above PET, for example, a composite resin containing a polyester resin using the above PET and a styrenic resin, and the like.

It is preferable that the styrenic resin is a styrenic resin obtained by carrying out addition polymerization of raw material monomers containing a styrenic compound.

As the styrenic compound, at least styrene or a styrene derivative such as α-methylstyrene or vinyltoluene (hereinafter, styrene and styrene derivatives are collectively simply referred to as “styrenic compounds”) is used.

The content of the styrenic compound is preferably 50% by mass or more, more preferably 70% by mass or more, and even more preferably 90% by mass or more, of the raw material monomers for the styrenic resin.

The raw material monomers for the styrenic resin usable other than the styrenic compounds include ethylenically unsaturated monoolefins such as ethylene and propylene; diolefins such as butadiene; halovinyls such as vinyl chloride; vinyl esters such as vinyl acetate and vinyl propionate; ethylenic monocarboxylate esters such as dimethylaminoethyl (meth)acrylates; vinyl ethers such as vinyl methyl ether; vinylidene halides such as vinylidene chloride; N-vinyl compounds such as N-vinylpyrrolidone, and the like.

The addition polymerization reaction of the raw material monomers for the styrenic resin can be, for example, carried out by a conventional method, in the presence of a polymerization initiator such as dicumyl peroxide, a crosslinking agent, or the like, in the presence of an organic solvent or in the absence of solvents, and the temperature conditions are preferably 110° C. or higher, more preferably 120° C. or higher, and more preferably 130° C. or higher, and preferably 250° C. or lower, more preferably 200° C. or lower, and more preferably 170° C. or lower.

When an organic solvent is used during the addition polymerization reaction, xylene, toluene, methyl ethyl ketone, acetone, or the like can be used. The amount of the organic solvent used is preferably 10 parts by mass or more and 50 parts by mass or less, based on 100 parts by mass of the raw material monomers for the styrenic resin.

It is preferable that the composite resin is a composite resin obtained by further using a dually reactive monomer capable of reacting with both of the raw material monomers for the polyester resin and the raw material monomers for the styrenic resin, in addition to the raw material monomers for the polyester resin and the raw material monomers for the styrenic resin. Therefore, when a composite resin is obtained by polymerizing raw material monomers for the polyester resin and the raw material monomers for the styrenic resin, it is preferable that the polycondensation reaction and/or addition polymerization reaction is carried out in the presence of a dually reactive monomer. By the presence thereof, the composite resin becomes a composite resin in which a polyester resin and a styrenic resin are bonded via a constituting unit derived from a dually reactive monomer, whereby the polyester resin and the styrenic resin are more finely and evenly dispersed therein.

In the present invention, it is preferable that the dually reactive monomer contains an alkyl (meth)acrylate of which alkyl group has 2 or more carbon atoms and 6 or less carbon atoms, from the viewpoint of low-temperature fusing ability, initial rise in charging, and optical density. Here, the term “(meth)acrylic acid” as used herein means acrylic acid, methacrylic acid, or both.

Specific examples of the alkyl (meth)acrylate include methyl (meth)acrylate, ethyl (meth)acrylate, (iso)propyl (meth)acrylate, 2-hydroxyethyl (meth)acrylate, (iso or tertiary) butyl (meth)acrylate, (iso)hexyl (meth)acrylate, and the like, among which butyl (meth)acrylate is preferred. The alkyl group may have a substituent such as a hydroxyl group, and “(iso or tertiary)” or “(iso)” means to include both cases where these groups are present and where these groups are absent, and in a case where these groups are absent, they are normal form.

The alkyl group of the alkyl (meth)acrylate has the number of carbon atoms of 2 or more, preferably 3 or more, and more preferably 4, and 6 or less, and preferably 4 or less.

The content of the alkyl (meth)acrylate of which alkyl group has 2 or more carbon atoms and 6 or less carbon atoms is preferably 85% by mol or more, more preferably 90% by mol or more, even more preferably 95% by mol or more, and even more preferably 100% by mol, of the dually reactive monomer.

Other dually reactive monomers include a compound having within the molecule at least one functional group selected from the group consisting of a hydroxyl group, a carboxy group, an epoxy group, a primary amino group, and a secondary amino group, preferably a hydroxyl group and/or a carboxy group, and more preferably a carboxy group, and an ethylenically unsaturated bond, for example, acrylic acid, methacrylic acid, fumaric acid, maleic acid, maleic anhydride, and the like. However, when the dually reactive monomer is used together with a polymerization inhibitor, a polycarboxylic acid compound having an ethylenically unsaturated bond such as fumaric acid functions as raw material monomers for the polyester resin. In this case, the fumaric acid or the like is not a dually reactive monomer but a raw material monomer for the polyester resin.

Here, the amount used of the dually reactive monomer having a carboxy group and an ethylenically unsaturated bond is not used or preferably small, and if used, the content thereof is preferably 5% by mass or less, and more preferably 3% by mass or less, of all the dually reactive monomers.

The content of the dually reactive monomer is preferably 30% by mass or more, and more preferably 40% by mass or more, and, from the viewpoint of storage property, the content is preferably 80% by mass or less, more preferably 70% by mass or less, and even more preferably 60% by mass or less, of a total amount of the raw material monomers for the styrenic resin and the dually reactive monomer.

It is preferable that the composite resin in the present invention is obtained by a method including a step A of carrying out addition polymerization of raw material monomers for a styrenic resin and a dually reactive monomer, and a step B of polycondensing raw material monomers for a polyester resin and PET, in which the step A and the step B are carried out in the same reaction vessel.

The step A and the step B may be each sequentially carried out or concurrently progressed, and in the present invention, it is preferable that the step A is carried out, and the step B is then carried out. By this manner, in contrast to a reduced content of the alcohol component usable in the transesterification reaction in a method where the polycondensation reaction is carried out prior to the addition polymerization reaction, it is considered that the dually reactive monomer and terminal hydroxyl groups of the alcohol component can efficiently be subjected to transesterification, whereby forming a crosslinked structure.

Here, the polycondensation reaction may be carried out in the presence of the raw material monomers for a styrenic resin and/or dually reactive monomer, and the addition polymerization reaction may be carried out in the presence of the raw material monomers for a polyester resin and/or PET, respectively. From the viewpoint of having an even molecular weight distribution of the formed styrenic resin, in a method of carrying out the step A and then the step B, it is desired that the step A is carried out preferably in the presence of PET, and more preferably in the presence of raw material monomers for a polyester resin other than trivalent or higher polyvalent monomers. The trivalent or higher polyvalent monomers such as tricarboxylic or higher polycarboxylic acid compounds and trihydric or higher polyhydric alcohols increase the viscosity of the polyester to make the molecular weight distribution of the formed styrenic resin undesirably uneven, it is preferable that these monomers are added to the reaction system after the step A.

The mass ratio of the polyester resin to the styrenic resin in the composite resin, i.e., polyester resin/styrenic resin, is preferably 60/40 or more, more preferably 70/30 or more, and even more preferably 75/25 or more, from the viewpoint of low-temperature fusing ability, and the mass ratio is preferably 95/5 or less, more preferably 90/10 or less, and even more preferably 85/15 or less, from the viewpoint of durability. Here, in the above calculation, the mass of the polyester resin is an amount obtained by subtracting an amount of a reaction water dehydrated by polycondensation reaction (calculated value) from the mass of the raw material monomers for the usable polyester resin. In addition, the amount of the styrenic resin is a total amount of the raw material monomers for the styrenic resin, the dually reactive monomer, and the polymerization initiator.

The softening point of the polyester resin is preferably 80° C. or higher, and more preferably 85° C. or higher, from the viewpoint of storage stability, and the softening point is preferably 170° C. or lower, and more preferably 150° C. or lower, from the viewpoint of low-temperature fusing ability.

It is preferable that the polyester resin is an amorphous resin. The crystallinity of the resin is expressed by a crystallinity index defined by a value of a ratio of a softening point to a highest temperature of endothermic peak determined by a differential scanning calorimeter, i.e. [softening point/highest temperature of endothermic peak]. The crystalline resin is a resin having a crystallinity index of 0.6 or more, preferably 0.7 or more, and more preferably 0.9 or more, and 1.4 or less, preferably 1.2 or less, and more preferably 1.1 or less. On the other hand, the amorphous resin is a resin having a crystallinity index exceeding 1.4, preferably exceeding 1.5, more preferably 1.6 or more, or a resin having a crystallinity index of less than 0.6, and preferably 0.5 or less. The crystallinity of the resin can be adjusted by the kinds of the raw material monomers and ratios thereof, production conditions, e.g., reaction temperature, reaction time, cooling rate, and the like. Here, the highest temperature of endothermic peak refers to a temperature of the peak on the highest temperature side among endothermic peaks observed.

The glass transition temperature of the polyester resin is preferably 40° C. or higher, and more preferably 50° C. or higher, from the viewpoint of storage stability, and the glass transition temperature is preferably 80° C. or lower, more preferably 70° C. or lower, and even more preferably 60° C. or lower, from the viewpoint of low-temperature fusing ability.

The acid value of the polyester resin is preferably 10 mgKOH/g or more, more preferably 15 mgKOH/g or more, and even more preferably 20 mgKOH/g or more, from the viewpoint of initial rise in charging, and the acid value is preferably 40 mgKOH/g or less, and more preferably 30 mgKOH/g or less, from the viewpoint of hygroscopicity.

The number-average molecular weight of the polyester resin is preferably 1,500 or more, more preferably 2,000 or more, and even more preferably 2,500 or more, from the viewpoint of hot offset resistance, and the number-average molecular weight is preferably 6,000 or less, and more preferably 4,000 or less, from the viewpoint of low-temperature fusing ability.

It is preferable that the above physical properties of the polyester resin are such that a weighted average thereof is within the above range in a case where the polyester resins are composed of two or more kinds of polyesters.

The resin binder composition of the present invention preferably contains two polyester resins having softening points that are different from each other by 15° C. or more, more preferably at least one is a polyester resin in which the above PET is used, and even more preferably both are polyester resins in which the above PET is used, from the viewpoint of low-temperature fusing ability and hot offset resistance. In a case where one of the polyester resins is a polyester resin in which the above PET is used, it is preferable that a polyester resin having a higher softening point is a polyester resin in which PET is used, from the viewpoint of colorant dispersibility.

The softening point of the polyester resin H having a higher softening point is preferably 110° C. or higher, and more preferably 130° C. or higher, from the viewpoint of hot offset resistance, and the softening point is preferably 170° C. or lower, and more preferably 150° C. or lower, from the viewpoint of low-temperature fusing ability.

The softening point of the polyester resin L having a lower softening point is preferably 80° C. or higher, and more preferably 90° C. or higher, from the viewpoint of hot offset resistance, and the softening point is preferably 120° C. or lower, and more preferably 110° C. or lower, from the viewpoint of low-temperature fusing ability.

The difference between the softening points of the polyester resin H and the polyester resin L is preferably 15° C. or more, and more preferably 20° C. or more, from the viewpoint of low-temperature fusing ability and hot offset resistance, and the difference is preferably 60° C. or less, and more preferably 50° C. or less, from the viewpoint of low-temperature fusing ability and hot offset resistance.

The softening point of the polyester resin can be adjusted by crosslinking degree or the like. It is preferable that the polyester resin H contains a trimellitic acid compound, from the above viewpoint, and the content of the trimellitic acid compound in the carboxylic acid component is preferably 10% by mol or more, and more preferably 15% by mol or more, and the content is preferably 35% by mol or less, and more preferably 30% by mol or less, from the viewpoint of low-temperature fusing ability. In addition, it is preferable that the polyester resin H contains an aliphatic dicarboxylic acid compound, from the viewpoint of low-temperature fusing ability. The content of the aliphatic dicarboxylic acid compound in the carboxylic acid component is preferably 3% by mol or more, and more preferably 5% by mol or more, from the viewpoint of low-temperature fusing ability, and the content is preferably 50% by mol or less, and more preferably 40% by mol or less, from the viewpoint of initial raise of charging.

On the other hand, although it is preferable that the polyester resin L contains a trimellitic acid compound, from the viewpoint of hot offset resistance, and the content of the trimellitic acid compound is preferably 10% by mol or less, and more preferably 8% by mol or less, of the carboxylic acid component.

The mass ratio of the polyester resin H to the polyester resin L, polyester resin H/polyester resin L, is preferably 20/80 or more, more preferably 40/60 or more, and even more preferably 55/45 or more, from the viewpoint of hot offset resistance, and the mass ratio is preferably 90/10 or less, more preferably 80/20 or less, and even more preferably 70/30 or less, from the viewpoint of low-temperature fusing ability.

The content of the polyester resin in which the above PET is used is preferably 40% by mass or more, more preferably 60% by mass or more, even more preferably 80% by mass or more, even more preferably 90% by mass or more, even more preferably 95% by mass or more, and even more preferably 100% by mass, of the resin binder composition.

The resin composition of the present invention may contain a resin besides the polyester resin in which the above PET is used.

The resin binder besides the polyester resin in which the above PET is used includes crystalline polyester resins, and the like. It is preferable that the crystalline polyester resin is, for example, a polycondensate of an alcohol component containing an aliphatic diol having 2 or more carbon atoms and 16 or less carbon atoms and a carboxylic acid component containing an aliphatic dicarboxylic acid compound having 4 or more carbon atoms and 14 or less carbon atoms.

The aliphatic diol having 2 or more carbon atoms and 16 or less carbon atoms contained in the alcohol component includes ethylene glycol, 1,2-propanediol, 1,3-propanediol, 1,4-butanediol, 1,5-pentanediol, 1,6-hexanediol, 1,7-heptanediol, 1,8-octanediol, neopentyl glycol, 1,9-nonanediol, 1,10-decanediol, 1,11-undecanediol, 1,12-dodecanediol, and the like, which may be used alone or in combination of two or more kinds.

The aliphatic diol having 2 or more carbon atoms and 16 or less carbon atoms is preferably an α,ω-aliphatic diol having hydroxyl groups at terminals of a carbon chain, and an α,ω-linear alkanediol is more preferred, from the viewpoint of low-temperature fusing ability.

The number of carbon atoms of the aliphatic diol is 2 or more, preferably 4 or more, and more preferably 6 or more, from the viewpoint of low-temperature fusing ability, and the number of carbon atoms is 16 or less, preferably 14 or less, more preferably 12 or less, and even more preferably 8 or less, from the viewpoint of storage property.

The content of the aliphatic diol having 2 or more carbon atoms and 16 or less carbon atoms is 95% by mol or more, preferably 98% by mol or more, and more preferably 100% by mol, of the alcohol component of the crystalline polyester resin, from the viewpoint of low-temperature fusing ability.

Other alcohol components include aliphatic diols having 17 or more carbon atoms; aromatic diols such as alkylene oxide adducts of bisphenol A; trihydric or higher polyhydric alcohols such as sorbitol, pentaerythritol, glycerol, and trimethylolpropane, and the like.

The aliphatic dicarboxylic acid compound having 4 or more carbon atoms and 14 or less carbon atoms contained in the carboxylic acid component includes succinic acid (number of carbon atoms: 4), fumaric acid (number of carbon atoms: 4), adipic acid (number of carbon atoms: 6), suberic acid (number of carbon atoms: 8), azelaic acid (number of carbon atoms: 9), sebacic acid (number of carbon atoms: 10), dodecanedioic acid (number of carbon atoms: 12), tetradecanedioic acid (number of carbon atoms: 14), a succinic acid having an alkyl group or alkenyl group in a side chain, anhydrides of these acids, alkyl esters of which alkyl has 1 or more carbon atoms and 3 or less carbon atoms of these acids, and the like.

The number of carbon atoms of the aliphatic dicarboxylic acid compound is 4 or more, preferably 6 or more, and more preferably 8 or more, from the viewpoint of low-temperature fusing ability, and the number of carbon atoms is 14 or less, and preferably 12 or less, from the viewpoint of storage property.

The content of the aliphatic dicarboxylic acid compound having 4 or more carbon atoms and 14 or less carbon atoms is 95% by mol or more, preferably 98% by mol or more, and even more preferably 100% by mol, of the carboxylic acid component of the crystalline polyester resin, from the viewpoint of low-temperature fusing ability.

Other carboxylic acid components include aromatic dicarboxylic acid compounds such as phthalic acid, isophthalic acid, and terephthalic acid, aliphatic dicarboxylic acid compounds having 15 or more carbon atoms, tricarboxylic or higher polycarboxylic acid compounds such as trimellitic acid and pyromellitic acid, anhydrides of these acids, alkyl esters of which alkyl has 1 to 3 carbon atoms of these acids, and the like.

The equivalent molar ratio of the carboxylic acid component to the alcohol component of the crystalline polyester resin, i.e. COOH group or groups to OH group or groups, is preferably 0.8 or more, and more preferably 0.9 or more, from the viewpoint of storage property, and the equivalent molar ratio is preferably 1.2 or less, and more preferably 1.1 or less, from the viewpoint of low-temperature fusing ability.

The polycondensation reaction conditions of the alcohol component and the carboxylic acid component are the same as the reaction conditions of the polyester resin mentioned above, except that the reaction is carried out at a temperature of 140° C. or higher and 250° C. or lower or so.

The softening point of the crystalline polyester resin is preferably 50° C. or higher, and more preferably 65° C. or higher, from the viewpoint of storage property, and the softening point is preferably 120° C. or lower, more preferably 110° C. or lower, even more preferably 100° C. or lower, and even more preferably 85° C. or lower, from the viewpoint of low-temperature fusing ability.

The melting point of the crystalline polyester resin is preferably 40° C. or higher, and more preferably 60° C. or higher, from the viewpoint of storage property, and the melting point is preferably 110° C. or lower, more preferably 100° C. or lower, and even more preferably 80° C. or lower, from the viewpoint of low-temperature fusing ability.

The acid value of the crystalline polyester resin is preferably 5 mgKOH/g or more, and more preferably 8 mgKOH/g or more, from the viewpoint of initial rise in charging, and the acid value is preferably 30 mgKOH/g or less, and more preferably 20 mgKOH/g or less, from the viewpoint of low-temperature fusing ability.

The number-average molecular weight of the crystalline polyester resin is preferably 1,500 or more, and more preferably 2,000 or more, from the viewpoint of filming resistance, and the number-average molecular weight is preferably 5,000 or less, and more preferably 4,000 or less, from the viewpoint of low-temperature fusing ability.

The mass ratio of the polyester resin in which the above PET is used to the crystalline polyester resin, i.e., polyester resin in which the above PET is used/crystalline polyester resin, is preferably 75/25 or more, more preferably 80/20 or more, and even more preferably 85/15 or more, from the viewpoint of storage property, and the mass ratio is preferably 99/1 or less, and more preferably 95/5 or less, from the viewpoint of low-temperature fusing ability.

Here, in a case where the resin binder composition of the present invention contains two or more kinds of resins, a mixture of those resins may be used as a resin binder, or those resins may be directly supplied in the mixing of the raw materials during the production of the toner.

In the toner of the present invention, besides the resin binder (the resin binder composition of the present invention), an additive such as a colorant, a releasing agent, a charge control agent, a magnetic particulate, a flowability improver, an electric conductivity modifier, a reinforcing filler such as a fibrous material, an antioxidant, or a cleanability improver may be contained, and it is preferable that the toner contains a colorant, a releasing agent, and a charge control agent.

As the colorant, all the dyes and pigments which are used as colorants for a toner can be used, and carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazo yellow, or the like can be used. The toner of the present invention may be any one of black toners and color toners.

The content of the colorant, based on 100 parts by mass of the resin binder, is preferably 1 part by mass or more, and more preferably 2 parts by mass or more, and preferably 40 parts by mass or less, and more preferably 10 parts by mass or less, from the viewpoint of improving optical density and low-temperature fusing ability of the toner.

The releasing agent includes aliphatic hydrocarbon waxes such as polypropylene wax, polyethylene wax, polypropylene-polyethylene copolymer wax, microcrystalline wax, paraffin waxes, Fischer-Tropsch wax, and sazole wax, or oxides thereof; ester waxes such as carnauba wax, montan wax, deacidified waxes thereof, and fatty acid ester waxes; fatty acid amides, fatty acids, higher alcohols, metal salts of fatty acids, and the like. These releasing agents can be used alone or in a mixture of two or more kinds.

The melting point of the releasing agent is preferably 60° C. or higher, and more preferably 70° C. or higher, from the viewpoint of transfer ability of the toner, and the melting point is preferably 160° C. or lower, more preferably 140° C. or lower, even more preferably 120° C. or lower, and even more preferably 110° C. or lower, from the viewpoint of low-temperature fusing ability.

From the viewpoint of low-temperature fusing ability and offset resistance of the toner and from the viewpoint of dispersibility into the resin binder, the content of the releasing agent, based on 100 parts by mass of the resin binder, is preferably 0.5 parts by mass or more, more preferably 1.0 part by mass or more, and even more preferably 1.5 parts by mass or more, and preferably 10 parts by mass or less, more preferably 8 parts by mass or less, and even more preferably 7 parts by mass or less.

The charge control agent may contain, but not particularly limited to, any of positively chargeable charge control agents and negatively chargeable charge control agents.

The positively chargeable charge control agent includes Nigrosine dyes, for example, "Nigrosine Base EX," "OIL BLACK BS," "OIL BLACK SO," "BONTRON N-01," "BONTRON N-04," "BONTRON N-07," "BONTRON N-09," "BONTRON N-11," hereinabove manufactured by Orient Chemical Industries Co., Ltd., and the like; triphenylmethane-based dyes containing a tertiary amine as a side chain; quaternary ammonium salt compounds, for example, "BONTRON P-51," manufactured by Orient Chemical Industries Co., Ltd., cetyltrimethylammonium bromide, "COPY CHARGE PX VP435," manufactured by Clariant, Ltd., and the like; polyamine resins, for example, "AFP-B," manufactured by Orient Chemical Industries Co., Ltd., and the like; imidazole derivatives, for example, "PLZ-2001," "PLZ-8001," hereinabove manufactured by Shikoku Chemicals Corporation, and the like; styrene-acrylic resins, for example, "FCA-701PT," manufactured by FUJIKURAKASEI CO., LTD., and the like.

In addition, the negatively chargeable charge control agent includes metal-containing azo dyes, for example, "VARIFAST BLACK 3804," "BONTRON S-31, "BONTRON S-32," "BONTRON S-34," "BONTRON S-36," hereinabove manufactured by Orient Chemical Industries Co., Ltd., "AIZEN SPILON BLACK TRH," "T-77," manufactured by Hodogaya Chemical Co., Ltd., and the like; metal compounds of benzilic acid compounds, for example, "LR-147," "LR-297," hereinabove manufactured by Japan Carlit Co., Ltd.; metal compounds of salicylic acid compounds, for example, "BONTRON E-81," "BONTRON E-84," "BONTRON E-88," "BONTRON E-304," hereinabove manufactured by Orient Chemical Industries Co., Ltd., "TN-105," manufactured by Hodogaya Chemical Co., Ltd., and the like; copper phthalocyanine dyes; quaternary ammonium salts, for example, "COPY CHARGE NX VP434," manufactured by Clariant, Ltd.; nitroimidazole derivatives and the like; organometallic compounds and the like.

The content of the charge control agent, based on 100 parts by mass of the resin binder, is preferably 0.01 parts by mass or more, and more preferably 0.2 parts by mass or more, and preferably 10 parts by mass or less, more preferably 5 parts by mass or less, even more preferably 3 parts by mass or less, and even more preferably 2 parts by mass or less, from the viewpoint of charging stability of the toner.

The toner of the present invention may be a toner obtained by any of a conventional known method such as a melt-kneading method, an emulsion phase-inversion method, or a polymerization method, and a pulverized toner according to a melt-kneading method is preferred, from the viewpoint of productivity and colorant dispersibility. In the case of a pulverized toner according to a melt-kneading method, for example, a toner can be produced by homogeneously mixing raw materials such as a resin binder, a colorant, a releasing agent, and a charge control agent, with a mixer such as a Henschel mixer, thereafter melt-kneading the mixture with a tightly closed kneader, a single-screw or twin-screw extruder, an open roller-type kneader, or the like, cooling, pulverizing, and classifying the product.

In the toner of the present invention, it is preferable to use an external additive in order to improve transfer ability. The external additive includes fine inorganic particles of silica, alumina, titania, zirconia, tin oxide, zinc oxide, and the like, and fine organic particles of resin particles such as fine melamine resin particles and fine polytetrafluoroethylene resin particles, and two or more kinds of them may be used in combination. Among them, silica is preferred, and a hydrophobic silica that is hydrophobically treated is more preferred, from the viewpoint of transfer ability of the toner.

The hydrophobic treatment agent for hydrophobically treating the surface of silica particles includes hexamethyldisilazane (HMDS), dimethyldichlorosilane (DMDS), a silicone oil, octyltriethoxysilane (OTES), methyltriethoxysilane, and the like.

The average particle size of the external additive is preferably 10 nm or more, and more preferably 15 nm or more, and preferably 250 nm or less, more preferably 200 nm or less, and even more preferably 90 nm or less, from the viewpoint of charging ability, flowability, and transfer ability of the toner.

The content of the external additive, based on 100 parts by mass of the toner before treatment with the external additive, is preferably 0.05 parts by mass or more, more preferably 0.1 parts by mass or more, and even more preferably 0.3 parts by mass or more, and preferably 5 parts by mass or less, and more preferably 3 parts by mass or less, from the viewpoint of charging ability, flowability, and transfer ability of the toner.

The volume-median particle size $D_{50}$ of the toner of the present invention is preferably 3 μm or more, and more preferably 4 μm or more, and preferably 15 μm or less, and more preferably 10 μm or less. Here, the volume-median particle size $D_{50}$ as used herein means a particle size of which cumulative volume frequency calculated on a volume percentage is 50% counted from the smaller particle sizes. Also, in a case where the toner is treated with an external additive, the volume-median particle size of the toner particles before treatment with the external additive is defined as a volume-median particle size of the toner.

The toner of the present invention can be used as a toner for monocomponent development, or a toner can be used as a two-component developer in a mixture with a carrier.

With regard to the embodiments described above, the present invention further discloses resin binder compositions for a toner and toners for electrophotography as set forth below.

<1> A resin binder composition for a toner, containing a polyester resin, which is a polycondensate of a polyethylene terephthalate, a carboxylic acid component, and an alcohol component, wherein the polyethylene terephthalate contains a polyethylene terephthalate having a IV value of 0.40 or more and 0.75 or less, and wherein the alcohol component contains an aliphatic diol having a hydroxyl group bonded to a secondary carbon atom having 2 or more carbon atoms and 4 or less carbon atoms in an amount of 40% by mol or more and 100% by mol or less.

<2> The resin binder composition for a toner according to the above <1>, wherein the content of the polyethylene terephthalate having a IV value of 0.40 or more and 0.75 or less is 90% by mass or more, preferably 95% by mass or more, more preferably 98% by mass or more, and even more preferably 100% by mass, of a total amount of the polyethylene terephthalate.

<3> The resin binder composition for a toner according to the above <1> or <2>, wherein the IV value of the polyethylene terephthalate is 0.50 or more, and preferably 0.55 or more, and 0.72 or less, preferably 0.68 or less, more preferably 0.65 or less, and even more preferably 0.62 or less.

<4> The resin binder composition for a toner according to any one of the above <1> to <3>, wherein the amount of the polyethylene terephthalate, based on a total of 100 mol of the carboxylic acid component and the alcohol component, is 5 mol or more, preferably 10 mol or more, and more preferably 20 mol or more, and 90 mol or less, preferably 80 mol or less, more preferably 70 mol or less, and even more preferably 60 mol or less.

<5> The resin binder composition for a toner according to any one of the above <1> to <4>, wherein the aliphatic diol having a hydroxyl group bonded to a secondary carbon atom having 2 or more carbon atoms and 4 or less carbon atoms is at least one member selected from the group consisting of 1,2-propanediol, 1,2-butanediol, 1,3-butanediol, and 2,3-butanediol, and preferably 1,2-propanediol.

<6> The resin binder composition for a toner according to any one of the above <1> to <5>, wherein the content of the aliphatic diol having a hydroxyl group bonded to a secondary carbon atom having 2 or more carbon atoms and 4 or less carbon atoms, preferably 1,2-propanediol, is 50% by mol or more, preferably 55% by mol or more, and more preferably 60% by mol or more, and 95% by mol or less, preferably 90% by mol or less, and more preferably 85% by mol or less, of the alcohol component.

<7> The resin binder composition for a toner according to the above any one of the above <1> to <6>, wherein the alcohol component further contains an α,ω-linear alkanediol having 2 or more carbon atoms and 4 or less carbon atoms.

<8> The resin binder composition for a toner according to the above <7>, wherein the α,ω-linear alkanediol having 2 or more carbon atoms and 4 or less carbon atoms is at least one member selected from the group consisting of ethylene glycol, 1,3-propanediol, and 1,4-butanediol, and preferably 1,4-butanediol.

<9> The resin binder composition for a toner according to the above <7> or <8>, wherein the content of the α,ω-linear alkanediol having 2 or more carbon atoms and 4 or less carbon atoms, preferably 1,4-butanediol, is 5% by mol or more, preferably 10% by mol or more, and more preferably 15% by mol or more, and 50% by mol or less, preferably 45% by mol or less, and more preferably 40% by mol or less, of the alcohol component.

<10> The resin binder composition for a toner according to any one of the above <7> to <9>, wherein the molar ratio of the aliphatic diol having a hydroxyl group bonded to a secondary carbon atom having 2 or more carbon atoms and 4 or less carbon atoms to the α,ω-linear alkanediol having 2 or more carbon atoms and 4 or less carbon atoms, i.e. the aliphatic diol having a hydroxyl group bonded to a secondary carbon atom/the α,ω-linear alkanediol, is 50/50 or more, preferably 55/45 or more, and more preferably 60/40 or more, and 95/5 or less, preferably 90/10 or less, and more preferably 85/15 or less.

<11> The resin binder composition for a toner according to any one of the above <1> to <10>, wherein the content of the aliphatic diol is 80% by mol or more, preferably 90% by mol or more, more preferably 95% by mol or more, and even more preferably 100% by mol, of the alcohol component.

<12> The resin binder composition for a toner according to any one of the above <1> to <11>, wherein the carboxylic acid component is at least one member selected from the group consisting of aromatic dicarboxylic acid compounds, aliphatic dicarboxylic acid compounds, and tricarboxylic or higher polycarboxylic acid compounds, and the carboxylic acid component preferably contains an aromatic dicarboxylic acid compound.

<13> The resin binder composition for a toner according to the above <12>, wherein the aromatic dicarboxylic acid compound is phthalic acid, isophthalic acid, terephthalic acid; anhydrides of those acids or alkyl (1 to 3 carbon atoms) esters of those acids.

<14> The resin binder composition for a toner according to the above <12> or <13>, wherein the content of the aromatic dicarboxylic acid compound is 20% by mol or more, and preferably 40% by mol or more, and 95% by mol or less, preferably 90% by mol or less, more preferably 85% by mol or less, and even more preferably 70% by mol or less, of the carboxylic acid component.

<15> The resin binder composition for a toner according to any one of the above <12> to <14>, wherein the aliphatic dicarboxylic acid compound is an aliphatic dicarboxylic acid such as oxalic acid, malonic acid, maleic acid, fumaric acid, citraconic acid, itaconic acid, glutaconic acid, a succinic acid which may be substituted with an alkyl group having from 1 to 20 carbon atoms or an alkenyl group having from 2 to 20 carbon atoms, or adipic acid; an anhydride of those acids or an alkyl (1 to 3 carbon atoms) ester of those acids, and the aliphatic dicarboxylic acid compound preferably contains a succinic acid substituted with an alkyl group having from 1 to 20 carbon atoms or an alkenyl group having from 2 to 20 carbon atoms.

<16> The resin binder composition for a toner according to any one of the above <1> to <15>, wherein the softening point of the polyester resin is 80° C. or higher, and preferably 85° C. or higher, and 170° C. or lower, and preferably 150° C. or lower.

<17> The resin binder composition for a toner according to any one of the above <1> to <16>, wherein the glass transition temperature of the polyester resin is 40° C. or higher, and preferably 50° C. or higher, and 80° C. or lower, preferably 70° C. or lower, and more preferably 60° C. or lower.

<18> The resin binder composition for a toner according to any one of the above <1> to <17>, wherein the acid value of the polyester resin is 10 mgKOH/g or more, preferably 15 mgKOH/g or more, and more preferably 20 mgKOH/g or more, and 40 mgKOH/g or less, and preferably 30 mgKOH/g or less.

<19> The resin binder composition for a toner according to any one of the above <1> to <18>, wherein the number-average molecular weight of the polyester resin is 1,500 or more, preferably 2,000 or more, and more preferably 2,500 or more, and 6,000 or less, and preferably 4,000 or less.

<20> The resin binder composition for a toner according to any one of the above <1> to <19>, which contains two kinds of polyester resins of which softening points are different by 15° C. or more, and preferably 20° C. or more, wherein the two kinds of the polyester resins are such that a polyester resin H has a softening point of 110° C. or higher, and preferably 130° C. or higher, and 170° C. or lower, and preferably 150° C. or lower, and that a polyester resin L has a softening point of 80° C. or higher, and preferably 90° C. or higher, and 120° C. or lower, and preferably 110° C. or lower, wherein at least one of the polyester resins is a polyester resin which is a polycondensate of a polyethylene terephthalate, a carboxylic acid component, and an alcohol component, wherein the above polyethylene terephthalate contains a polyethylene terephthalate having a IV value of 0.40 or more and 0.75 or less.

<21> The resin binder composition for a toner according to the above <20>, wherein the mass ratio of the polyester resin H to the polyester resin L, i.e., polyester resin H/polyester resin L, is 20/80 or more, preferably 40/60 or more, and more preferably 55/45 or more, and 90/10 or less, preferably 80/20 or less, and more preferably 70/30 or less.

<22> The resin binder composition for a toner according to any one of the above <1> to <21>, wherein the polyester resin is a urethane-modified polyester resin in which the polyester resin is urethane-extended with a polyisocyanate compound.

<23> The resin binder composition for a toner according to any one of the above <1> to <22>, which is a composite resin containing a polyester resin as defined in any one of the above <1> to <22>.

<24> The resin binder composition for a toner according to the above <23>, wherein the composite resin is a composite resin containing a polyester resin as defined in any one of the above <1> to <22> and a styrenic resin.

<25> The resin binder composition for a toner according to the above <24>, wherein the styrenic resin is a styrenic resin obtained by carrying out addition polymerization of raw material monomers containing a styrenic compound.

<26> The resin binder composition for a toner according to any one of the above <1> to <22>, wherein the polyester resin as defined in any one of the above <1> to <22> is an amorphous polyester resin, and further contains a crystalline polyester resin.

<27> The resin binder composition for a toner according to the above <26>, wherein the crystalline polyester resin is a polycondensate of an alcohol component containing an aliphatic diol having 2 or more carbon atoms and 16 or less carbon atoms and a carboxylic acid component containing an aliphatic dicarboxylic acid compound having 4 or more carbon atoms and 14 or less carbon atoms.

<28> A method for producing a polyester resin including the step of carrying out a polycondensation reaction of a polyethylene terephthalate, a carboxylic acid component, and an alcohol component in the presence of an esterification catalyst, wherein the polyethylene terephthalate contains a polyethylene terephthalate having a IV value of 0.40 or more and 0.75 or less, and wherein the alcohol component contains an aliphatic diol having a hydroxyl group bonded to a secondary carbon atom having 2 or more carbon atoms and 4 or less carbon atoms in an amount of 40% by mol or more and 100% by mol or less.

<29> A toner for electrophotography containing a resin binder composition for a toner as defined in any one of the above <1> to <27>.

The present invention will be described hereinbelow more specifically by the Examples, without intending to limit the present invention to these Examples. The physical properties of the resins and the like can be measured in accordance with the following methods.

[IV Value of PET]

A sample is dissolved in a 60/40 mass ratio mixed solvent of phenol/tetrachloroethane at a concentration of 4 g/L, and the solution is subjected to a measurement with Ubbelohde viscometer, and the value can be obtained by the following formula.

$$IV=(-1+\sqrt{1+4k\eta})/(2kC),$$

wherein k=0.33, and C=0.004 g/mL, and η=(t1/t0)−1, wherein t0 is the number of seconds of dropping only the solvent, and t1 is the number of seconds of a dropping sample solution.

[Softening Point of Resin]

Using a flow tester "CFT-500D," manufactured by Shimadzu Corporation, a 1 g sample is extruded through a nozzle having a diameter of 1 mm and a length of 1 mm with applying a load of 1.96 MPa thereto with a plunger, while heating the sample at a heating rate of 6° C./min. The softening point refers to a temperature at which half of the sample flows out, when plotting a downward movement of the plunger of the flow tester against temperature.

[Highest Temperature of Endothermic Peak of Resin]

Using a differential scanning calorimeter "Q-100," manufactured by TA Instruments, Japan, a 0.01 to 0.02 g sample is weighed out in an aluminum pan, the sample is cooled from room temperature (25° C.) to 0° C. at a cooling rate of 10° C./min, and kept at 0° C. for one minute. Thereafter, the measurements are taken while heating at a rate of 10° C./min. Of the endothermic peaks observed, a temperature of the peak of the highest temperature side is defined as a highest temperature of endothermic peak.

[Glass Transition Temperature of Resin]

Using a differential scanning calorimeter "Q-100," manufactured by TA Instruments, Japan, a 0.01 to 0.02 g sample is weighed out in an aluminum pan, heated to 200° C., and cooled from that temperature to 0° C. at a cooling rate of 10° C./min. Next, the temperature of the sample is raised at a heating rate of 10° C./min to measure endothermic peaks. A temperature of an intersection of the extension of the baseline of equal to or lower than the highest temperature of endothermic peak and the tangential line showing the maximum inclination between the kick-off of the peak and the top of the peak is defined as a glass transition temperature.

[Acid Value of Resin]

The acid value is determined by a method according to JIS K0070 except that only the determination solvent is changed from a mixed solvent of ethanol and ether as prescribed in JIS K0070 to a mixed solvent of acetone and toluene in a volume ratio of acetone:toluene=1:1.

[Number-Average Molecular Weight of Resin]

The number-average molecular weight is obtained in accordance with a gel permeation chromatography (GPC) method, according to the following method.

(1) Preparation of Sample Solution

A sample is dissolved in tetrahydrofuran (an amorphous resin) or chloroform (a crystalline resin) so as to have a concentration of 0.5 g/100 mL. Next, this solution is filtered with a PTFE-type membrane filter "DISMIC-25JP," manufactured by Toyo Roshi Kaisha, Ltd., having a pore size of 0.20 μm, to remove insoluble components, to provide a sample solution.

(2) Measurement of Molecular Weight

Using the following measurement apparatus and analyzing column, the measurement is taken by allowing tetrahydrofuran (an amorphous resin) or chloroform (a crystalline resin) to flow through a column as an eluent at a flow rate of 1 mL per minute, stabilizing the column in a thermostat at 40° C., and loading 100 μL of a sample solution thereto. The molecular weight of the sample is calculated based on the previously drawn calibration curve. At this time, a calibration curve drawn from several kinds of monodisperse polystyrenes, manufactured by Tosoh Corporation, A-500 ($5.0\times10^2$), A-1000 ($1.01\times10^3$), A-2500 ($2.63\times10^3$), A-5000 ($5.97\times10^3$), F-1 ($1.02\times10^4$), F-2 ($1.81\times10^4$), F-4 ($3.97\times10^4$), F-10 ($9.64\times10^4$), F-20 ($1.90\times10^5$), F-40 ($4.27\times10^5$), F-80 ($7.06\times10^5$), and F-128 ($1.09\times10^6$) as standard samples is used. The values within the parentheses show molecular weights.

Measurement Apparatus: HLC-8220GPC, manufactured by Tosoh Corporation

Analyzing Column; TSKgel $GMH_{XL}$+TSKgel $G3000H_{XL}$, manufactured by Tosoh Corporation.

[Melting Point of Releasing Agent]

Using a differential scanning calorimeter "DSC Q-100" manufactured by TA Instruments, Japan, a 0.01 to 0.02 g sample is weighed out in an aluminum pan, the sample is heated to 200° C. at a heating rate of 10° C./min, and the sample is cooled from that temperature to −10° C. at a cooling rate of 5° C./min. Next, the measurements are taken while heating the sample to 180° C. at a rate of 10° C./min. A highest temperature of endothermic peak observed in the melting endothermic curve obtained is defined as a melting point of a releasing agent.

[Average Particle Size of External Additive]

The average particle size refers to a number-average particle size, which is defined as a number-average of measurements of particle sizes, averages of lengths and breadths, for 500 particles determined from a photograph taken with a scanning electron microscope (SEM).

[Volume-Median Particle Size of Toner]

Measuring Apparatus: Coulter Multisizer II, manufactured by Beckman Coulter, Inc.

Aperture Diameter: 50 μm

Analyzing Software: Coulter Multisizer AccuComp Ver. 1.19, manufactured by Beckman Coulter, Inc.

Electrolytic Solution: Isotone II, manufactured by Beckman Coulter, Inc.

Dispersion: EMULGEN 109P, manufactured by Kao Corporation, polyoxyethylene lauryl ether, HLB (Griffin):

13.6, is dissolved in the above electrolytic solution to adjust to a concentration of 5% by mass to provide a dispersion.

Dispersion Conditions: Ten milligrams of a measurement sample is added to 5 mL of the above dispersion, and the mixture is dispersed for 1 minute with an ultrasonic disperser, the machine under the name of US-1, manufactured by SND Co., Ltd., output: 80 W, and 25 mL of the above electrolytic solution is then added to the dispersion, and further dispersed with the ultrasonic disperser for 1 minute, to prepare a sample dispersion.

Measurement Conditions: The above sample dispersion is added to 100 mL of the above electrolytic solution to adjust to a concentration at which particle sizes of 30,000 particles can be measured in 20 seconds, and the 30,000 particles are measured, and a volume-median particle size $D_{50}$ is obtained from the particle size distribution.

Production Example 1 of Resins

Resins H1 to H10 and Resins L1 to L5

A 10-liter four-neck flask equipped with a thermometer, a stainless steel stirring rod, a fractionating column, a dehydration tube, a condenser tube, and a nitrogen inlet tube was charged with raw material monomers other than trimellitic anhydride, an esterification catalyst, and an esterification promoter, each as listed in each of Tables 1 to 3, and the contents were heated to 185° C. in a mantle heater in a nitrogen atmosphere, and reacted for 5 hours. Thereafter, the temperature was raised stepwise to 220° C. at a rate of 5° C./h. Subsequently, after having confirmed that a reaction percentage at 220° C. reached 90% or more, the reaction mixture was cooled to 210° C., trimellitic anhydride was then added thereto, and the reaction mixture was reacted at an ambient pressure for 1 hour, and then reacted at 8 kPa to a desired softening point, to provide each of polyester resins. In the production examples of resins, the reaction percentage refers to a value calculated by:

[amount of generated water in reaction/theoretical amount of generated water]×100.

Production Example 2 of Resins

Resin H11 and Resin L6

A 10-liter four-neck flask equipped with a thermometer, a stainless steel stirring rod, a fractionating column, a dehydration tube, a condenser tube, and a nitrogen inlet tube was charged with raw material monomers other than trimellitic anhydride, an esterification catalyst, and an esterification promoter, each as listed in Table 2 or 3, and the contents were heated to 185° C. in a mantle heater in a nitrogen atmosphere, and reacted for 5 hours. Thereafter, the temperature was raised stepwise to 220° C. at a rate of 5° C./h. Subsequently, after having confirmed that a reaction percentage at 220° C. reached 90% or more, the reaction mixture was cooled to 210° C., trimellitic anhydride was added thereto, and the reaction mixture was reacted at an ambient pressure for 1 hour, and then reacted at 8 kPa to a desired softening point, to provide each of polyester resins. Further, isophorone diisocyanate as listed in Table 2 or 3 was added thereto, and the mixture was reacted at 180° C. for 30 minutes, to provide each of urethane-modified polyester resins.

Production Example 3 of Resins

Resin H12 and Resin L7

A 10-liter four-neck flask equipped with a thermometer, a stainless steel stirring rod, a reflux condenser, and a nitrogen inlet tube was charged with raw material monomers for a polyester resin other than trimellitic anhydride as listed in Table 4, and the contents were heated to 165° C. in a mantle heater in a nitrogen atmosphere. Thereto was added dropwise a mixture of raw material monomers for a styrenic resin, a dually reactive monomer, and a polymerization initiator, each as listed in Table 4 to carry out the polymerization. Thereafter, an esterification catalyst was added thereto, and the reaction mixture was heated to 180° C., and reacted thereat for 5 hours. The mixture was then heated to 220° C. over 8 hours, and after having reached 220° C., the mixture was held for 5 hours. Thereafter, the reaction mixture was cooled to 210° C., trimellitic anhydride was then supplied thereto, the reaction mixture was held at 210° C. for 1 hour, and then subjected to a reaction under a reduced pressure of 8.0 kPa, and the reaction mixture was then reacted until a softening point as listed in the table was reached, to provide each of composite resins.

Production Example 4 of Resin

Resin C1

A 10-liter four-neck flask equipped with a thermometer, a stainless steel stirring rod, a fractionating column, a dehydration tube, a condenser tube, and a nitrogen inlet tube was charged with an alcohol component, a carboxylic acid component, and an esterification catalyst, each as listed in Table 5, and the contents were heated to 140° C. in a mantle heater in a nitrogen atmosphere. The mixture was reacted for 5 hours, and then heated to 200° C. at a rate of 10° C./h. After having confirmed that a reaction percentage at 200° C. reached 80% or more, the reaction mixture was reacted at 8 kPa to a desired softening point, to provide a crystalline polyester resin.

TABLE 1

| | | Resin H1 | | Resin H2 | | Resin H3 | | Resin H4 | | Resin H5 | |
|---|---|---|---|---|---|---|---|---|---|---|---|
| | | Molar Ratio | g | Molar Ratio | g | Molar Ratio | g | Molar Ratio | g | Molar Ratio | g |
| Raw | Alcohol Component | | | | | | | | | | |
| Material Monomers | 1,2-Propanediol | 40 | 425.6 | 30 | 319.2 | 50 | 532 | 60 | 638.4 | 40 | 425.6 |
| | 1,4-Butanediol | 20 | 252 | 10 | 126 | 35 | 441 | — | — | 20 | 252 |
| | Carboxylic Acid Component | | | | | | | | | | |
| | Terephthalic Acid | 40 | 929.6 | 20 | 464.8 | 65 | 1,510.6 | 40 | 929.6 | 40 | 929.6 |
| | Trimellitic Anhydride | 10 | 268.8 | 10 | 268.8 | 10 | 268.8 | 10 | 268.8 | 10 | 268.8 |

TABLE 1-continued

| | | Resin H1 | | Resin H2 | | Resin H3 | | Resin H4 | | Resin H5 | |
|---|---|---|---|---|---|---|---|---|---|---|---|
| | PET | | | | | | | | | | |
| | PET1 (IV = 0.60) | 40 | 1,075.2 | 60 | 1,612.8 | 15 | 403.2 | 40 | 1,075.2 | — | — |
| | PET2 (IV = 0.75) | — | — | — | — | — | — | — | — | 40 | 1,075.2 |
| | | Mass Ratio | g | Mass Ratio | g | Mass Ratio | g | Mass Ratio | g | Mass Ratio | g |
| | Esterification Catalyst | | | | | | | | | | |
| | Tin(II) 2-Ethylhexanoate | 0.5 | 14.8 | 0.5 | 14.0 | 0.5 | 15.8 | 0.5 | 14.6 | 0.5 | 9.4 |
| | Promoter | | | | | | | | | | |
| | Gallic Acid Monohydrate | 0.03 | 0.89 | 0.03 | 0.84 | 0.03 | 0.95 | 0.03 | 0.87 | 0.03 | 0.56 |
| Physical Properties | Softening Point, ° C. | 143.7 | | 137.5 | | 148.9 | | 151.6 | | 145.4 | |
| | Highest Temperature of Endothermic Peak, ° C. | 65.1 | | 63.3 | | 69.8 | | 72.1 | | 64.6 | |
| | Softening Point/Highest Temp. of Endothermic Peak | 2.21 | | 2.17 | | 2.13 | | 2.10 | | 2.25 | |
| | Glass Transition Temperature, ° C. | 62.3 | | 59.4 | | 66.2 | | 69.3 | | 61.4 | |
| | Acid Value, mgKOH/g | 12.4 | | 10.3 | | 20.3 | | 26.4 | | 13.1 | |
| | Number—Average Molecular Weight | 4,200 | | 4,600 | | 3,800 | | 3,700 | | 4,000 | |

Note 1)
The mass ratio is a mass ratio based on 100 parts by mass of a total amount of the alcohol component, the carboxylic acid component, and PET.
Note 2)
PET1: RAMAPET L1, manufactured by Indorama Ventures
PET2: RAMAPET N2G, manufactured by Indorama Ventures

TABLE 2

| | | Resin H6 | | Resin H7 | | Resin H8 | | Resin H9 | | Resin H10 | | Resin H11 | |
|---|---|---|---|---|---|---|---|---|---|---|---|---|---|
| | | Molar Ratio | g | Molar Ratio | g | Molar Ratio | g | Molar Ratio | g | Molar Ratio | g | Molar Ratio | g |
| Raw Material Monomers | Alcohol Component | | | | | | | | | | | | |
| | 1,2-Propanediol | 40 | 425.6 | 40 | 425.6 | — | — | 40 | 425.6 | 40 | 425.6 | 40 | 425.6 |
| | 1,3-Propanediol | 20 | 212.8 | — | — | — | — | — | — | — | — | — | — |
| | 1,4-Butanediol | — | — | 20 | 252 | 20 | 252 | 20 | 252 | 20 | 252 | 20 | 252 |
| | Neopentyl Glycol | — | — | — | — | 40 | 582.4 | — | — | 40 | 582.4 | — | — |
| | Carboxylic Acid Component | | | | | | | | | | | | |
| | Terephthalic Acid | 40 | 929.6 | 30 | 697.2 | 40 | 929.6 | 40 | 929.6 | 80 | 1,859.2 | 40 | 929.6 |
| | Tetrapropenylsuccinic Anhydride | — | — | 10 | 375.2 | — | — | — | — | — | — | — | — |
| | Trimellitic Anhydride | 10 | 268.8 | 10 | 268.8 | 10 | 268.8 | 10 | 268.8 | 10 | 268.8 | 10 | 268.8 |
| | PET | | | | | | | | | | | | |
| | PET1 (IV = 0.60) | 40 | 1,075.2 | 40 | 1,075.2 | 40 | 1,075.2 | — | — | — | — | 40 | 1,075.2 |
| | PET3 (IV = 0.84) | — | — | — | — | — | — | 40 | 1,075.2 | — | — | — | — |
| | Isophorone Diisocyanate | — | — | — | — | — | — | — | — | — | — | — | 54.0 |
| | | Mass Ratio | g | Mass Ratio | g | Mass Ratio | g | Mass Ratio | g | Mass Ratio | g | Mass Ratio | g |
| | Esterification Catalyst | | | | | | | | | | | | |
| | Tin(II) 2-Ethylhexanoate | 0.5 | 14.6 | 0.5 | 15.5 | 0.5 | 15.5 | 0.5 | 9.4 | 0.5 | 16.9 | 0.5 | 16.9 |
| | Promoter | | | | | | | | | | | | |
| | Gallic Acid Monohydrate | 0.03 | 0.87 | 0.03 | 0.93 | 0.03 | 0.93 | 0.03 | 0.56 | 0.03 | 1.02 | 0.03 | 1.02 |
| Physical Properties | Softening Point, ° C. | 137.5 | | 140.0 | | 138.6 | | 145.6 | | 144.2 | | 150.3 | |
| | Highest Temperature of Endothermic Peak, ° C. | 61.9 | | 60.0 | | 58.6 | | 66.7 | | 64.2 | | 64.3 | |
| | Softening Point/Highest Temp. of Endothermic Peak | 2.22 | | 2.33 | | 2.37 | | 2.18 | | 2.25 | | 2.34 | |

TABLE 2-continued

| | Resin H6 | Resin H7 | Resin H8 | Resin H9 | Resin H10 | Resin H11 |
|---|---|---|---|---|---|---|
| Glass Transition Temperature, ° C. | 58.4 | 56.1 | 55.4 | 63.1 | 61.6 | 60.1 |
| Acid Value, mgKOH/g | 10.3 | 8.3 | 6.4 | 11.1 | 17.3 | 14.3 |
| Number—Av. Molecular Weight | 4,500 | 4,700 | 4,600 | 4,100 | 4,300 | 4,800 |

Note 1)
The mass ratio is a mass ratio based on 100 parts by mass of a total amount of the alcohol component, the carboxylic acid component, and PET.
Note 2)
PET1: RAMAPET L1, manufactured by Indorama Ventures
PET3: RAMAPET S1, manufactured by Indorama Ventures

TABLE 3

| | | Resin L1 | | Resin L2 | | Resin L3 | | Resin L4 | | Resin L5 | | Resin L6 | |
|---|---|---|---|---|---|---|---|---|---|---|---|---|---|
| | | Molar Ratio | g | Molar Ratio | g | Molar Ratio | g | Molar Ratio | g | Molar Ratio | g | Molar Ratio | g |
| Raw Material Monomers | Alcohol Component | | | | | | | | | | | | |
| | 1,2-Propanediol | 40 | 425.6 | 40 | 425.6 | — | — | 40 | 425.6 | 40 | 425.6 | 40 | 425.6 |
| | 1,4-Butanediol | 20 | 252 | 20 | 252 | 20 | 252 | 20 | 252 | 20 | 252 | 20 | 252 |
| | Ethylene Glycol | — | — | — | — | — | — | — | — | 40 | 347.2 | — | — |
| | Neopentyl Glycol | — | — | — | — | 40 | 582.4 | — | — | — | — | — | — |
| | Carboxylic Acid Component | | | | | | | | | | | | |
| | Terephthalic Acid | 50 | 1162 | 50 | 1162 | 50 | 1162 | 50 | 1162 | 80 | 1,859.2 | 50 | 1,162 |
| | Trimellitic Anhydride | 3 | 80.64 | 3 | 80.64 | 3 | 80.64 | 3 | 80.64 | 3 | 80.64 | 3 | 80.64 |
| | PET | | | | | | | | | | | | |
| | PET1 (W = 0.60) | 40 | 1,075.2 | — | — | 40 | 1,075.2 | — | — | — | — | 40 | 1,075.2 |
| | PET2 (W = 0.75) | — | — | 40 | 1,075.2 | — | — | — | — | — | — | — | — |
| | PET3 (W = 0.84) | — | — | — | — | — | — | 40 | 1,075.2 | — | — | — | — |
| | Isophorone Diisocyanate | — | — | — | — | — | — | — | — | — | — | — | 54.6 |
| | | Mass Ratio | g | Mass Ratio | g | Mass Ratio | g | Mass Ratio | g | Mass Ratio | g | Mass Ratio | g |
| | Esterification Catalyst | | | | | | | | | | | | |
| | Tin(II) 2-Ethylhexanoate | 0.5 | 15.0 | 0.5 | 9.6 | 0.5 | 15.8 | 0.5 | 9.6 | 0.5 | 14.8 | 0.5 | 15.0 |
| | Promoter | | | | | | | | | | | | |
| | Gallic Acid Monohydrate | 0.03 | 0.90 | 0.03 | 0.58 | 0.03 | 0.95 | 0.03 | 0.58 | 0.03 | 0.89 | 0.03 | 0.90 |
| Physical Properties | Softening Point, ° C. | 100.4 | | 103.6 | | 101.2 | | 105.6 | | 102.9 | | 107.8 | |
| | Highest Temperature of Endothermic Peak, ° C. | 60.1 | | 59.3 | | 57.6 | | 61.2 | | 58.7 | | 58.6 | |
| | Softening Point/Highest Temp. of Endothermic Peak | 1.67 | | 1.75 | | 1.76 | | 1.73 | | 1.75 | | 1.84 | |
| | Glass Transition Temperature, ° C. | 56.7 | | 55.4 | | 54.3 | | 57.1 | | 55.0 | | 54.6 | |
| | Acid Value, mgKOH/g | 21.5 | | 19.6 | | 14.5 | | 18.4 | | 15.9 | | 18.2 | |
| | Number—Av. Molecular Weight | 2,200 | | 2,300 | | 2,500 | | 2,600 | | 2,700 | | 2,900 | |

Note 1)
The mass ratio is a mass ratio based on 100 parts by mass of a total amount of the alcohol component, the carboxylic acid component, and PET.
Note 2)
PET1: RAMAPET L1, manufactured by Indorama Ventures
PET2: RAMAPET N2G, manufactured by Indorama Ventures
PET3: RAMAPET S1, manufactured by Indorama Ventures

TABLE 4

| | | Resin H11 | | Resin L7 | |
|---|---|---|---|---|---|
| | | g | Molar Ratio | g | Molar Ratio |
| Raw Material Monomers for Polyester Resin | | | | | |
| Alcohol Component | 1,2-Propanediol | 760 | 40 | 760 | 40 |
| | 1,4-Butanediol | 450 | 20 | 450 | 20 |
| Carboxylic Acid Component | Terephthalic Acid | 1,660 | 40 | 2,075 | 50 |
| | Trimellitic Anhydride | 480 | 10 | 144 | 3 |
| PET | PET1(IV = 0.6)[1)] | 1,920 | 40 | 1,920 | 40 |
| | | g | Mass Ratio | g | Mass Ratio |
| Raw Material Monomers for Styrenic Resin | | | | | |
| Styrene | | 568 | 50 | 575 | 50 |
| Dually Reactive Monomer | | | | | |
| Butyl Acrylate | | 568 | 50 | 575 | 50 |
| Polymerization Initiator[2)] | | | | | |
| Dibutyl Peroxide | | 68 | 8 | 69 | 8 |
| Esterification Catalyst[3)] | | | | | |
| Tin(II) 2-Ethylhexanoate | | 28 | 0.5 | 29 | 0.5 |
| Polyester Resin/Styrenic Resin[4)] (Mass Ratio) | | 80/20 | | 80/20 | |
| Physical Properties | Softening Point, ° C. | 139.6 | | 105.6 | |
| | Highest Temperature of Endothermic Peak, ° C. | 60.3 | | 58.4 | |
| | Softening Point/Highest Temp, of Endothermic Peak | 2.32 | | 1.81 | |
| | Glass Transition Temperature, ° C. | 57.2 | | 54.9 | |
| | Acid Value, mgKOH/g | 15.3 | | 21.0 | |
| | Number-Average Molecular Weight | 3,800 | | 2,400 | |

1)PET1: RAMAPET L1, manufactured by Indorama Ventures

2)The mass ratio of the polymerization initiator is a mass ratio based on 100 parts by mass of a total amount of the raw material monomers for styrenic resin and a dually reactive monomer.

3)The mass ratio of the esterification catalyst is a mass ratio based on 100 parts by mass of a total amount of the alcohol component, the carboxylic acid component, and PET.

4)The mass of the polyester resin is an amount subtracting the amount of reaction water dehydrated by polycondensation reaction from the mass of the raw material monomers for a polyester resin used. Also, the amount of the styrenic resin is a total amount of the raw material monomers for a styrenic resin, a dually reactive monomer, and a polymerization initiator.

TABLE 5

| | Resin C1 | |
|---|---|---|
| | Molar Ratio | g |
| Alcohol Component | | |
| 1,6-Hexanediol | 100 | 1,180 |
| Carboxylic Acid Component | | |
| Sebacic Acid | 103 | 2,080.6 |
| | Mass Ratio | g |
| Esterification Catalyst | | |
| Tin(II) 2-Ethylhexanoate | 0.5 | 16.3 |
| COOH group or groups/OH group or groups, Equivalent Molar Ratio | 1.03 | |
| Softening Point, ° C. | 68.9 | |
| Highest Temperature of Endothermic Peak [Melting Point], ° C. | 70.4 | |

TABLE 5-continued

| | Resin C1 |
|---|---|
| Softening Point/Highest Temp. of Endothermic Peak | 0.98 |
| Acid Value, mgKOH/g | 15.7 |
| Number-Average Molecular Weight | 3,400 |

Note)
The mass ratio of the esterification catalyst is a mass ratio based on 100 parts by mass of a total amount of the alcohol component and the carboxylic acid component.

Examples 1 to 14 and Comparative Examples 1 to 3

Resin binders as listed in Table 6 in a total amount of 100 parts by mass, 1 part by mass of a negatively chargeable charge control agent "BONTRON E-81" manufactured by Orient Chemical Industries Co., Ltd., 5 parts by mass of a colorant "Pigment blue 15:3" manufactured by DAINICHISEIKA COLOR & CHEMICALS MFG. CO., LTD., and 2 parts by mass of a releasing agent "HNP-9" manufactured by NIPPON SEIRO CO., LTD., a paraffin wax, melting point: 80° C. were sufficiently mixed with a Henschel mixer. Thereafter, the mixture was melt-kneaded with a co-rotating twin-screw extruder having a full length of the kneading part of 1,560 mm, a screw diameter of 42 mm, and a barrel inner diameter of 43 mm, at a rotational speed of the roller of 200 r/min and a heating temperature within the roller of 100° C. The feeding rate of the mixture was 20 kg/h, and an average residence time was about 18 seconds. The melt-kneaded product obtained was cooled and roughly pulverized, then pulverized with a jet mill, and classified, to provide toner particles having a volume-median particle size $D_{50}$ of 8 μm.

To 100 parts by mass of the toner particles obtained was added 1.0 part by mass of a hydrophobic silica "AEROSIL NAX-50" manufactured by Nihon Aerosil Co., Ltd., hydrophobic treatment agent: HMDS, average particle size: about 30 nm as an external additive, and mixed with a Henschel mixer, to provide a toner.

Test Example 1

Low-Temperature Fusing Ability

Each of the toners was loaded to a nonmagnetic monocomponent developer device "OKI MICROLINE 5400" manufactured by Oki Data Corporation. With adjusting an amount of toner adhesion to 0.45±0.03 mg/cm$^2$, a solid image of a size of 4.1 cm×13.0 cm was printed out on "J sheet" manufactured by Fuji Xerox Co., Ltd. The solid image was taken out before passing through a fusing device, to provide an unfused image. The unfused image obtained was fused with an external fusing device which was a modified fusing device of "Microtine 3010" manufactured by Oki Data Corporation at a fusing rate of 240 mm/sec while setting a fusing roller temperature at 100° C. Thereafter, the same procedures were carried out with setting a fusing roller temperature at 105° C. The unfused images were subjected to a fusing treatment at each of temperatures while raising the fusing roller temperatures to 200° C. in an increment of 5° C., to provide fused images. A mending tape manufactured by Sumitomo 3M Limited was adhered to images fused at each of the temperatures, and thereafter a 500 g cylindrical weight was placed thereon, so that the tape was sufficiently adhered to the fused images. Thereafter, the mending tape was carefully and slowly removed from the fused images, and the optical reflective densities of the images after the tape removal were measured with a reflective densitometer "RD-915" manufactured by Macbeth Process Measurements Co. The images before tape adhesion were also previously measured for their optical reflective densities, and a temperature of the fusing roller at which a ratio of values (reflective density after tape removal/reflective density before tape adhesion]×100) initially exceeds 90% is defined as a lowest fusing temperature, and low-temperature fusing ability was evaluated. The results are shown in Table 6. It is shown that the lower the lowest fusing temperature, the more excellent the low-temperature fusing ability.

Test Example 2

Initial Rise in Charging

A 50-mL polyethylene bottle was charged with 0.6 g of a toner and 19.4 g of a silicone ferrite carrier manufactured by Kanto Denka Kogyo, average particle size: 90 μm, under the conditions of a temperature of 25° C. and a relative humidity of 50%, and the contents were mixed with a ball-mill at a rate of 250 r/min. The electric charges were measured with a Q/M meter manufactured by EPPING.

After a given period of mixing time, a developer in a defined amount was supplied into a cell provided in the Q/M meter, and only the toner was aspirated for 90 seconds through a sieve having a sieve opening of 32 μm that was made of stainless steel, twilled, wire diameter: 0.0035 mm. The voltage change generated on the carrier at this time was monitored, and a value for [a total electrical charge (μC) after 90 seconds/amount (g) of toner aspirated] was defined as electric charges (μC/g). A ratio of electric charges after a mixing time of 60 seconds to electric charges after a mixing time of 600 seconds, i.e. electric charges after a mixing time of 60 seconds/electric charges after a mixing time of 600 seconds, was calculated, to evaluate the initial rise in charging. The results are shown in Table 6. It is shown that the more the ratio approximates 1, the more excellent the initial rise in charging.

Test Example 3

Filming Resistance on Photoconductor

Each of the toners was loaded to a nonmagnetic mono-component developer device "OKI MICROLINE 5400" manufactured by Oki Data Corporation, and continuous printing was carried out at a print coverage of 5% under the environmental conditions of 25° C. and 50% RH. A full-page solid image was printed out every 1,000 sheets of printing, and white spots caused by filming of the toner on the photoconductor were visually observed. The continuous printing was halted at the point where the generation of white spots was confirmed, and printing was carried out up to 12,000 sheets at most. The results are shown in Table 6. It is shown that the larger the number of printed sheets, the more excellent the filming resistance.

TABLE 6

| | Resin Binder | | | | | | Low-Temp. | Initial | Filming |
|---|---|---|---|---|---|---|---|---|---|
| | Kinds | Parts by Mass | Kinds | Parts by Mass | Kinds | Parts by Mass | Fusing Ability | Rise in Charging | Resistance on Photo-conductor |
| Ex. 1 | H1 | 60 | L1 | 40 | — | — | 120 | 0.98 | 12,000 |
| Ex. 2 | H2 | 60 | L1 | 40 | — | — | 130 | 0.96 | 10,000 |
| Ex. 3 | H3 | 60 | L1 | 40 | — | — | 120 | 0.88 | 9,000 |
| Ex. 4 | H4 | 60 | L1 | 40 | — | — | 140 | 0.95 | 8,000 |
| Ex. 5 | H5 | 60 | L2 | 40 | — | — | 140 | 0.86 | 6,000 |
| Ex. 6 | H6 | 60 | L1 | 40 | — | — | 130 | 0.95 | 9,000 |
| Ex. 7 | H7 | 60 | L1 | 40 | — | — | 110 | 0.91 | 10,000 |
| Ex. 8 | H1 | 60 | L5 | 40 | — | — | 140 | 0.83 | 9,000 |
| Ex. 9 | H10 | 60 | L1 | 40 | — | — | 140 | 0.78 | 8,000 |
| Ex. 10 | H1 | 80 | L1 | 20 | — | — | 160 | 0.92 | 12,000 |
| Ex. 11 | H1 | 30 | L1 | 70 | — | — | 110 | 0.91 | 6,000 |
| Ex. 12 | H12 | 60 | L7 | 40 | — | — | 130 | 0.90 | 9,000 |
| Ex. 13 | H1 | 60 | L1 | 30 | C1 | 10 | 110 | 0.95 | 7,000 |
| Ex. 14 | H11 | 60 | L6 | 40 | — | — | 140 | 0.71 | 7,000 |
| Comp. Ex. 1 | H8 | 60 | L3 | 40 | — | — | 120 | 0.65 | 4,000 |
| Comp. Ex. 2 | H9 | 60 | L4 | 40 | — | — | 140 | 0.31 | 2,000 |
| Comp. Ex. 3 | H10 | 60 | L5 | 40 | — | — | 150 | 0.41 | 1,000 |

It can be seen from the above results that the toners of Examples 1 to 14 are excellent in all of low-temperature fusing ability, initial rise in charging, and filming resistance on the photoconductor.

On the other hand, the toner of Comparative Example 1 containing a polyester resin without using an aliphatic diol having a hydroxyl group bonded to a secondary carbon atom is insufficient in initial rise in charging and filming resistance.

The toner of Comparative Example 2 containing a polyester resin using a PET having an ordinary IV value are insufficient in initial rise in charging and filming resistance.

The toner of Comparative Example 3 containing a polyester resin using ethylene glycol in place of the PET is insufficient in initial rise in charging and filming resistance.

The resin binder composition for a toner of the present invention is suitably used in the toner for electrophotography usable in development or the like of latent images formed in, for example, method for electrostatic image development, electrostatic recording method, electrostatic printing method or the like.

The invention claimed is:

1. A resin binder composition for a toner, comprising a polyester resin, which is a polycondensate of a polyethylene terephthalate, a carboxylic acid component, and an alcohol component, wherein the polyethylene terephthalate comprises a polyethylene terephthalate having a IV value of 0.40 to 0.62, and wherein the alcohol component comprises an aliphatic dial having a hydroxyl group bonded to a secondary carbon atom having 2 to 4 carbon atoms in an amount of 40% to 100% by mol.

2. The resin binder composition for a toner according to claim 1, wherein the content of the polyethylene terephthalate having a IV value of 0.40 to 0.62 is 90% by mass or more of a total amount of the polyethylene terephthalate.

3. The resin binder composition for a toner according to claim 1, wherein the amount of the polyethylene terephthalate is an amount such that the unit of terephthalic acid-ethylene glycol is 5 to 90 mol, based on 100 mol of a total of the carboxylic acid component and the alcohol component.

4. The resin binder composition for a toner according to claim 1, wherein the content of the aliphatic diol having a hydroxyl group bonded to a secondary carbon atom having 2 to 4 carbon atoms is 50% to 95% by mol of the alcohol component, and wherein the alcohol component further comprises an α,ω-linear alkanediol having 2 to 4 carbon atoms in an amount of 5% to 50% by mol.

5. The resin binder composition for a toner according to claim 4, wherein a molar ratio of the aliphatic diol having a hydroxyl group bonded to a secondary carbon atom having 2 to 4 carbon atoms to the α,ω-linear alkanediol having 2 to 4 carbon atoms (the aliphatic diol having a hydroxyl group bonded to a secondary carbon atom/the α,ω-linear alkanediol) is in a range of 50/50 to 95/5.

6. The resin binder composition for a toner according to claim 1, wherein the carboxylic acid component is at least one member selected from the group consisting of aromatic dicarboxylic acid compounds, aliphatic dicarboxylic acid compounds, and tricarboxylic or higher polycarboxylic acid compounds.

7. The resin binder composition for a toner according to claim 6, wherein the carboxylic acid component is at least an aliphatic dicarboxylic acid compound comprising a succinic acid substituted with an alkyl group having from 1 to 20 carbon atoms or an alkenyl group having from 2 to 20 carbon atoms.

8. The resin binder composition for a toner according to claim 1, wherein the resin binder comprises two kinds of polyester resins of which softening points differ by 15° C. or more, wherein the two kinds of polyester resins are a polyester resin H having a softening point of 110° C. to 170° C. and a polyester resin L having a softening point of 80° C. to 120° C., wherein at least one of the polyester resins is a polycondensate of a polyethylene terephthalate, a carboxylic acid component, and an alcohol component, the polyethylene terephthalate comprising a polyethylene terephthalate having a IV value of 0.40 to 0.62.

9. The resin binder composition for a toner according to claim 1, wherein the content of the aliphatic diol having a hydroxyl group bonded to a secondary carbon atom having 2 to 4 carbon atoms is 40% to 95% by mol of the alcohol component.

10. A toner for electrophotography comprising a resin binder composition for a toner as defined in claim 1.

11. The resin binder composition for a toner according to claim 1, wherein the aliphatic diol having a hydroxyl group bonded to a secondary carbon atom having 2 to 4 carbon atoms comprises at least one member selected from the group consisting of 1,2-propanediol, 1,2-butanediol, 1,3-butanediol, and 2,3-butanediol.

12. The resin binder composition for a toner according to claim 1, wherein the aliphatic diol having a hydroxyl group bonded to a secondary carbon atom having 2 to 4 carbon atoms comprises 1,2-propanediol.

13. A method for producing a polyester resin, comprising carrying out a polycondensation reaction of a polyethylene terephthalate, a carboxylic acid component, and an alcohol component in the presence of an esterification catalyst, wherein the polyethylene terephthalate comprises a polyethylene terephthalate having a IV value of 0.40 to 0.62, and wherein the alcohol component comprises an aliphatic diol having a hydroxyl group bonded to a secondary carbon atom having 2 to 4 carbon atoms in an amount of 40% to 100% by mol.

* * * * *